US009198351B2

(12) United States Patent
Tilly et al.

(10) Patent No.: US 9,198,351 B2
(45) Date of Patent: Dec. 1, 2015

(54) FRONT ATTACHMENT FOR HARVESTING CORN INCLUDING A DRIVE MECHANISM WITH A STEPLESSLY VARIABLE TRANSMISSION

(71) Applicant: CLAAS HUNGARIA KFT., Toeroekszentmiklos (HU)

(72) Inventors: Thomas Tilly, Warendorf (DE); Thomas Dennis Engler, Germaringen (DE)

(73) Assignee: CLAAS HUNGARIA KFT., Toeroekszentmiklos (HU)

( * ) Notice: Subject to any disclaimer, the term of this patent is extended or adjusted under 35 U.S.C. 154(b) by 222 days.

(21) Appl. No.: 13/944,143

(22) Filed: Jul. 17, 2013

(65) Prior Publication Data
US 2014/0020354 A1 Jan. 23, 2014

(30) Foreign Application Priority Data
Jul. 20, 2012 (DE) .......................... 10 2012 106 602

(51) Int. Cl.
*A01D 45/02* (2006.01)
(52) U.S. Cl.
CPC .................................. *A01D 45/021* (2013.01)
(58) Field of Classification Search
CPC ... A01D 45/021; A01D 43/082; A01D 45/02; A01D 45/025; A01D 41/142; A01D 69/00; A01D 29/14
USPC .................................................. 56/103, 119
See application file for complete search history.

(56) References Cited

U.S. PATENT DOCUMENTS

| 3,423,910 | A | * | 1/1969 | Shimamoto et al. | 56/13.3 |
| 3,520,121 | A | * | 7/1970 | Ashton et al. | 56/106 |
| 4,433,531 | A | * | 2/1984 | Kesl et al. | 56/106 |
| 4,524,571 | A | * | 6/1985 | Mak et al. | 56/98 |
| 4,738,651 | A | * | 4/1988 | Favache et al. | 474/19 |
| 6,370,853 | B1 | * | 4/2002 | Randall et al. | 56/14.2 |
| 8,578,689 | B2 | * | 11/2013 | Luetke-Harmann et al. | 56/119 |
| 2010/0300057 | A1 | * | 12/2010 | Luetke-Harmann et al. | 56/119 |
| 2012/0055131 | A1 | * | 3/2012 | Zegota et al. | 56/60 |

FOREIGN PATENT DOCUMENTS

DE       10 2005 021 792       11/2006

* cited by examiner

*Primary Examiner* — Árpád Fábián-Kovács
(74) *Attorney, Agent, or Firm* — Michael J. Striker

(57) ABSTRACT

A front attachment for harvesting corn for use in a self-propelled combine harvester includes harvesting devices for grasping and guiding the corn stalks, for picking the corn cobs and for conveying the picked corn cobs. The front attachment has intake conveyor mechanisms extending across the width thereof, snapping devices disposed downstream of the intake conveyor mechanisms in the direction of the crop flow embodying snapping rollers rotating opposite to the direction of travel and a cross conveyor equipped with opposing auger sections. The cross conveyor draws harvested corn cobs together in the center of the front attachment and feeds them from there to a feed rake. The intake conveyor mechanisms and/or the snapping rollers and/or the cross conveyor are driven by a driven mechanism of the combine harvester, which driven mechanism is connected to a steplessly variable transmission.

9 Claims, 4 Drawing Sheets

FRONT ATTACHMENT FOR HARVESTING CORN INCLUDING A DRIVE MECHANISM WITH A STEPLESSLY VARIABLE TRANSMISSION

CROSS-REFERENCE TO A RELATED APPLICATION

The invention described and claimed hereinbelow is also described in German Patent Application DE 10 2012 106 602.7, filed on Jul. 20, 2012. This German Patent Application, subject matter of which is incorporated herein by reference, provides the basis for a claim of priority of invention under 35 U.S.C. 119(a)-(d).

BACKGROUND OF THE INVENTION

The invention relates to a front attachment for harvesting corn for a self-propelled combine harvester. The inventive front attachment comprises harvesting devices for grasping and guiding the corn stalks, for picking the corn cobs and for conveying the picked corn cobs. In particular, the front attachment has intake conveyor mechanisms extending across the width thereof and snapping units, which are disposed downstream of the intake conveyor mechanisms in the direction of the crop flow and substantially comprise snapping rollers rotating opposite to direction of travel. The front attachment also has a cross conveyor equipped with opposing auger sections, by means of which harvested corn cobs can be drawn together in the center of the front attachment and fed from there to a feed rake. The intake conveyor mechanisms and/or the snapping rollers and/or the cross conveyor are driven via at least one driven mechanism of the combine harvester.

Corn, as a root crop, is generally cultivated in rows located approximately 75 cm apart, wherein sowing is carried out by sowing individual seeds. Corn plants that have gone to seed reach a height of up to three meters. The corn plant substantially comprises a corn stalk, corn leaves having a length of up to one meter and fruits in the form of corn cobs enclosed by husks. There are two main types of corn harvesting, namely harvesting fodder corn or biomass using a combine harvester and harvesting grain corn using a combine harvester equipped with an appropriate front attachment. The forage harvester fragmentizes the entire corn plant (including the corn kernels), to permit the subsequent use thereof as fodder, in the form of corn for silage. In this fragmentized form, the corn plant also can be supplied as biomass to biogas plants. The forage harvesters used to harvest the corn plants process the entire corn plant, as explained previously, and therefore the fruit (i.e. the corn cobs comprising the corn kernels), do not need to be removed from the remaining plant components.

In contrast, in order to harvest grain corn using a combine harvester, the header thereof (which is used to harvest grain), is replaced by a front attachment for harvesting corn. This front attachment comprises a plurality of harvesting devices, namely intake conveyor mechanisms. Intake conveyor mechanisms grasp the particular corn stalk and guide the corn stalk within a guide track, via a picking device, which ensures controlled intake of the entire corn plant and removal of the corn cob from the corn stalk, and a cross conveyor, which draws the corn cobs separated from the individual corn stalks to the center of the front attachment (in the trough thereof), and transfers the corn cobs to a feed rake. The feed rake, however, is a component of the combine harvester. Consequently, when the front harvesting attachment is coupled to the combine harvester, the front harvesting attachment is connected to the feed rake, which feeds the corn cobs to a threshing mechanism of the combine harvester during the harvesting operation.

During the snapping procedure, the particular corn stalk pulled in the direction of the ground and, during this motion, is cut off close to the ground by means of optionally provided chopping knives of a chopping device (which are disposed on a vertically extending knife shaft), fragmentized and deposited on the field. It is also possible to provide a chopping device (in the form of a mulching device or a free-swinging mower), underneath the feed rake of the combine harvester or to mount the chopping device on the rear panel of the front attachment. The chopping device should ensure complete fragmentation of the corn straw, which comprises leaf portions of the corn plants and the corn stalks. Completely fragmented corn straw is distributed more uniformly over the ground and can be worked completely into the ground in subsequent soil management. Working the corn straw completely into the ground and mixing the corn straw uniformly with the ground in order to promote the rotting of the corn straw is of considerable importance for the prevention of pest contamination, such as contamination by fusarioses or *Pyrausta nubilalis*, for example.

As previously explained, a combine harvester can be equipped with entirely different front harvesting attachments, depending on whether grain or rapeseed or corn shall be harvested. The harvesting attachments are then coupled to the feed rake and to at least one driven mechanism of the combine harvester. The front harvesting attachments also differ in terms of the variability of the speeds for the harvesting devices to be provided within the front harvesting attachments. The speed of the picking rollers, for example, must be varied depending on the stand density, the stalk length and the moisture content of the corn. Corresponding means for performing such a speed adjustment of harvesting devices disposed on the front harvesting attachment are already provided on the combine harvester. If the combine harvester is used only to harvest grain (which is frequently the case), this speed adjustment for a front attachment for harvesting corn (which increases the production costs of the combine harvester), is entirely superfluous.

A front attachment for harvesting corn of the type is known from DE 10 2005 021 792 A1. This front attachment (which is referred to in this document as a picker), is detachably fastened to a feed rake of a combine harvester. A feed rake shaft of this feed rake is driven by the combine harvester by means of a chain drive and protrudes via one end beyond the lateral extension of a feed rake housing in a form of a shaft stub, which is connected to a universal drive shaft. This universal drive shaft is connected on the other side to an input shaft of a transmission. An output shaft of the transmission drives a cross conveyor by means of a pinion and a chain. A chain drive extends from the drive shaft of the cross conveyor and is used to drive a cross shaft of the snapping unit. This cross shaft comprises two bevel gears, via which shafts extending in the longitudinal direction of the front attachment drive pairs of snapping rollers (via three bevel gears in each case). The cross shaft further comprises devices for grasping and guiding the corn stalks.

SUMMARY OF THE INVENTION

The present invention overcomes the shortcomings of known arts, such as those mentioned above.

The invention provides a drive system for a front attachment of a combine harvester for harvesting corn that facilitates optimal adaptation of the operation of the individual harvesting devices to the particular harvesting conditions, wherein a related control of different drive speeds is obtained without increasing the costs of the combine harvester, the use of which should be universal.

In an embodiment, the invention provides a front attachment for harvesting corn for a self-propelled combine harvester with harvesting devices for grasping and guiding corn stalks, for picking corn cobs and for conveying the picked corn cobs. The front attachment has intake conveyor mechanisms extending across the width thereof, snapping devices disposed downstream of the intake conveyor mechanisms in the direction of the crop flow and substantially comprise snapping rollers rotating opposite to the direction of travel and a cross conveyor equipped with opposing auger sections for drawing together harvested corn cobs in the center of the front attachment and fed from there to a feed rake. The intake conveyor mechanisms and/or the snapping rollers and/or the cross conveyor are driven via at least one driven mechanism of the combine harvester.

The at least one driven mechanism is connected to a steplessly variable transmission which is disposed at the front attachment and comprises an output shaft and which is directly or indirectly connected to a drive shaft of the intake conveyor mechanisms and/or a drive shaft of the snapping rollers and/or a knife shaft of a chopping device for chopping the corn stalks.

Therefore, the invention directly assigns drive devices to the front attachment, which are connected to the aforementioned harvesting devices and make it possible to change the drive speeds at these harvesting devices. Such configuration permits the combine harvester to be used universally regardless of which front attachment is coupled thereto. Headers for harvesting grain and rapeseed, and front attachments for harvesting corn can therefore be coupled to the driven mechanism of the combine harvester without the need to make changes with respect to the speed of the driven mechanism for the proper use of the front attachments (i.e. with respect to the particular crop).

Furthermore, the invention makes it possible to drive the individual harvesting devices of the front attachment, i.e. the intake conveyor devices, the snapping rollers, the cross conveyor or, optionally, the chopping device in part at the same speeds and in part at speeds that differ from one another. This adjustment takes place with consideration for the state of the crop. In order to achieve optimal operation, these adjustment procedures are implemented with the aid of at least one steplessly variable transmission, i.e. with highly precise tuning.

In contrast, according to DE 10 2005 021 792 A1, a transmission is provided between the driven mechanism of the combine harvester and the traction mechanism drive, which drives the cross conveyor, the snapping rollers, and the intake conveyor devices. The transmission drives the harvesting devices at a constant speed ratio. The drive speed of the traction mechanism drive is changeable only in steps according to the shifting of this transmission, wherein it is not described in detail how a related adjustment could take place and how many shift stages are provided.

According to the present invention, the different states of the crop (which is corn), are detected and, according thereto, the speeds of the individual harvesting devices of the front attachment are varied. The crop states that are utilized as parameters for a related adjustment are the height of the corn plants and/or the stand density and/or the moisture content of the corn cobs. These states of the crop are detected using an appropriate sensor system or manually by the driver, whereupon the driver varies the drive speeds of the harvesting devices in an appropriate manner.

For optimization, it is of primary importance that these speeds be varied steplessly across a large range. The features according to the invention also make it possible to determine that the harvesting devices mentioned are driven in such a manner that the speeds thereof can be adjusted independently of one another or jointly, combined in groups. The invention, for example, makes it possible to drive the snapping device and the cross conveyor jointly via the steplessly variable transmission. This ensures that the drive speeds of both of these mechanisms of the harvesting device are fixed relative to one another.

Furthermore, the steplessly variable transmission (which is driven by the driven mechanism of the combine harvester), also can drive a knife shaft of a chopping device to chop the corn stalks. The placement of the steplessly variable transmission on the front attachment also is important, to ensure that related adjustment devices are not part of the combine harvester. As explained previously, the combine harvester is used universally, i.e., it is possible to selectively dispose a grain header for harvesting grain and rapeseed, or to dispose the above-described front attachment on the combine harvester. Since a variation of the drive speeds of the snapping rollers and the cross conveyor is specific to the operation of the combine harvester equipped with a front attachment for harvesting corn, this would be entirely superfluous if the combine harvester were used exclusively to harvest grain (which is common in certain regions) and would increase the production costs of the combine harvester by an unwanted extent. Therefore, the related speed adjustment device (i.e. the steplessly variable transmission), is exclusively a component of the front attachment.

The at least one steplessly variable transmission is couplable via a universal drive shaft to the at least one driven mechanism and drives at least one of the harvesting devices via at least one downstream traction mechanism drive. The output shaft extending from the particular steplessly variable transmission is therefore connected to one or more traction mechanism drives. When a plurality of traction mechanism drives is used, different transmission ratios are specified for the harvesting devices driven thereby. The universal drive shaft is typically equipped with a coupling mechanism, by means of which the universal drive shaft can be coupled to the driven mechanism of the combine harvester.

Alternatively, the driven mechanism is connected to a multi-stage transmission disposed at the front attachment and comprising an output shaft which is connected exclusively directly or indirectly to a drive of the snapping rollers and the cross conveyor. Due to this arrangement of the transmission, the transmission ratio in the drive of the snapping rollers and the cross conveyor is adjustable independently of the drive of the remaining harvesting devices and, optionally, a chopping device. This transmission also is assigned to the front attachment and is driven by the driven mechanism of the combine harvester via a universal drive shaft. When the front attachment is mounted at the feed rake of the combine harvester, the universal drive shaft is coupled in an appropriate manner to the driven mechanism. It is also possible to provide further separate multi-stage transmissions for driving the intake conveyor mechanisms and, optionally, the chopping device.

In an embodiment, the at least one steplessly variable transmission is designed as a variator transmission. The variator transmission comprises a primary disc and a secondary disc, which are directly or indirectly supported at the front harvesting attachment. The primary disc is non-rotatably connected to a universal drive shaft. The universal drive shaft is coupled to the driven mechanism. The secondary disc is indirectly or directly connected to a drive mechanism of the intake conveyor mechanisms and/or a drive mechanism of one of the snapping rollers and/or a drive mechanism of the cross conveyor and/or a drive mechanism of the knife shaft of the chopping device. The primary and secondary discs are formed of conical discs, one of which is stationary and the other of which is displaceable in the axial direction with respect thereto.

In this case, one of the displaceable conical discs is hydraulically displaced (for example), while the other conical disc synchronously tracks this displacement while retaining the belt preload force. Alternatively, the steplessly variable transmission also may be designed as a hydrostatic transmission.

In addition, the driven mechanism is designed as one end of a feed rake shaft, to which the universal drive shaft is coupled and a further universal drive shaft is coupled to a second end of the feed rake shaft. The feed rake shaft protrudes as a shaft stub beyond the feed rake housing. The shaft stub is connected to the knife shaft in a driving manner via a further traction mechanism. The feed rake shaft, which accommodates gears in the interior of the feed rake housing for driving the conveyor chains and conveyor slats connected thereto, therefore extends out of the feed rake housing on both sides. The driven mechanism is located on one side of the feed rake housing and is connected to the chopping device, while the end of the feed rake shaft facing away therefrom comprises the other driven mechanism for the remaining harvesting devices. The result thereof is an arrangement that makes optimal use of the installation space available at the front attachment.

Furthermore, a universal drive shaft driving the steplessly variable transmission is connected to a drive mechanism of a hydraulic pump. This hydraulic pump, which supplies pressure medium to the adjustment devices and/or possible hydrostatic drive devices in the front attachment, is advantageously directly assigned to the front attachment and is not a component of the combine harvester. The hydraulic pump can also be an assembly having an oil cooler.

Since stones and other foreign objects enter the front attachment during harvesting and can damage components of the harvesting devices of the front attachment and a threshing unit of the downstream combine harvester, at least one overload clutch is disposed between the drive mechanism and a shaft of the cross conveyor and/or a drive mechanism of the snapping rollers. An appropriate overload clutch comprises shear pins or radially or axially routed pins that are supported via springs and engage via one end into a groove of an adjacent hub. Providing an appropriate overload clutch at the output shaft of the steplessly variable transmission thereby secures the drive of the snapping rollers and the cross conveyor.

In order to utilize space in an optimal manner, the steplessly variable transmission is disposed behind a rear panel of the front attachment. Such positioning of the stepless transmission has the advantage that the placement thereof does not increase the width of the front attachment.

In addition, the output shaft extending from the secondary disc drives the cross conveyor via a chain drive and drives the snapping rollers via a belt drive. A drive pulley and a chain sprocket are therefore disposed next to one another on the output shaft.

In a further embodiment, the at least one steplessly variable transmission is adjustable depending on the moisture content and/or stand density and/or stalk length of the corn plants. As previously explained, the corresponding parameters are detected via appropriate sensors, cameras, etc., or by the driver of the combine harvester. A regulating device, which is connected via signal lines to the sensors, cameras, etc., and which continuously adapts the transmission ratio of the at least one steplessly variable transmission to the corresponding conditions by means of a hydraulic control device, is a component of the front attachment or the combine harvester. This regulating device is preferably disposed at the front attachment in order to ensure the regulating device is a component of the front attachment in terms of structure and, therefore, the resultant costs.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
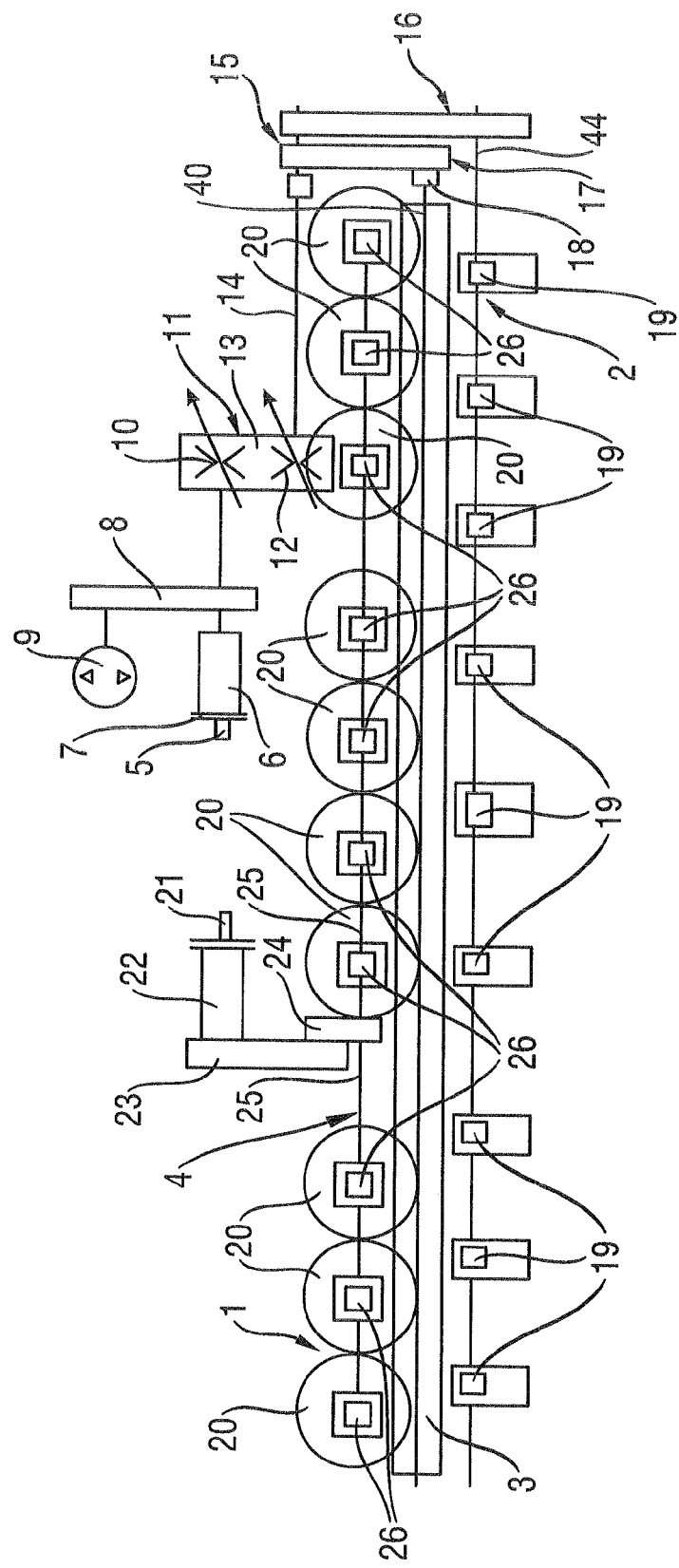
FIG. 1 shows a schematic representation of a drive system, according to the invention, which is disposed within a front attachment.

FIGS. 1 to 4 show a front attachment 1. FIG. 1 in particular shows, inter alia, a snapping device 2, a cross conveyor 3, and a chopping device 4. The snapping device 2 and the cross conveyor 3 are components of a harvesting device of the front attachment 1, which, in addition to the chopping device 4, are driven by a combine harvester. The snapping device 2 and the cross conveyor 3 are driven by a first driven mechanism 5 of the combine harvester by means of a first universal drive shaft 6. This first universal drive shaft 6 is selectively coupled to the first driven mechanism 5 by means of a form-locking clutch 7, i.e., when the front attachment 1 is installed on the combine harvester, the universal drive shaft 6 is connected in a driving manner to the first driven mechanism 5 via the form-locking clutch 7.

The first universal drive shaft 6 drives a hydraulic pump 9 via a belt drive 8. The hydraulic pump supplies pressure medium within the front attachment 1. To this end, non-illustrated hydraulic circuits are provided, via which control functions are performed at the front attachment 1 by means of appropriate hydraulic valves. Furthermore, the universal drive shaft 6 is connected to a primary disc 10 of a variator transmission 11, which also has a secondary disc 12 and a drive belt 13. An output shaft 14 of the variator transmission 11 (which extends from the secondary disc 12), extends to a first traction mechanism drive 15 comprising a belt drive 16 (which drives the snapping device 2) and a chain drive 17

(which drives the cross conveyor 3). Furthermore, an overload clutch 18 is disposed in the drive of the cross conveyor 3. The overload clutch automatically interrupts the drive of the cross conveyor 3 when a torque value is exceeded. Further overload clutches 19 are assigned to individual snapping rollers, which will be explained in conjunction with the following figures.

A second drive mechanism 21, at which a second universal drive shaft 22 engages, is provided opposite the above-described first drive mechanism 5. This second universal drive shaft 22 drives the chopping device 4 via a belt drive 23 and a transmission 24. As shown in FIG. 1, main drive shafts 25 extend from the transmission 24. The main drive shafts drive knives 20 of the chopping device 4 via vertically extending knife shafts. Overload clutches 26 are located at the drives of the knife shafts, which are in the form of bevel gears. Activation of the overload clutches 18, 19 or 26 also can be detected via a sensor system thereby signaling a failure of individual snapping rollers, individual knife drives of the chopping device 4 or the entire cross conveyor 3 to the driver in the cab of the combine harvester. The transmission 24 also can be in the form of a steplessly variable transmission or alternatively, transmission 24 may comprise a multi-stage transmission.

Figure 2:
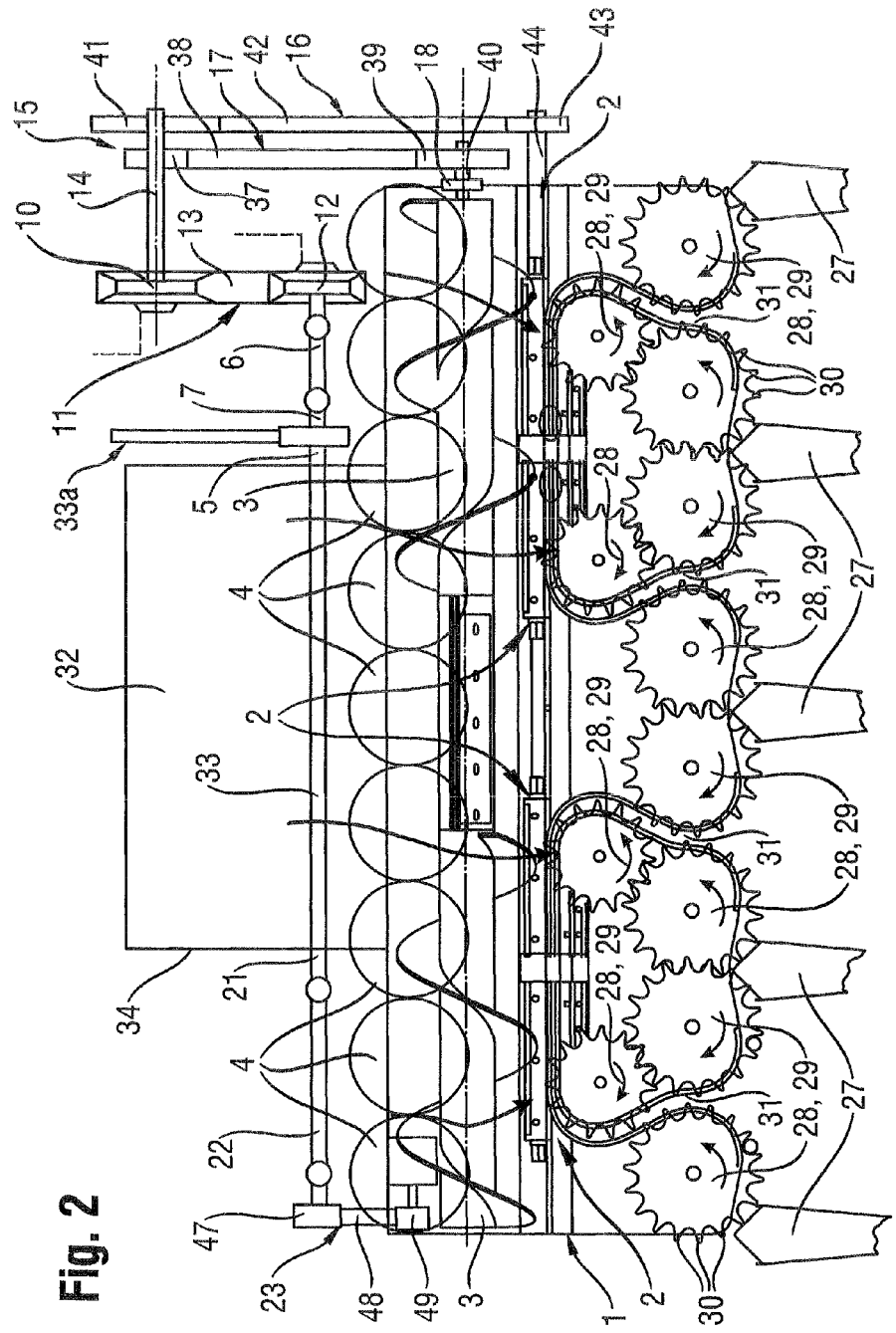
FIG. 2 shows a top view of a correspondingly designed drive system of a front attachment installed on a feed rake of a combine harvester.

FIG. 2 further shows the FIG. 1 front attachment 1 in greater detail. In FIG. 2, the front attachment 1 is shown to comprise crop dividers 27, downstream of which intake conveyor mechanisms 28 are disposed for grasping and guiding the corn stalks. The intake conveyor mechanisms comprise conveyor discs 29. The conveyor discs are equipped on the circumference thereof with conveyor tines 31 and are driven in pairs in opposing directions of rotation. The conveyor tines 30 move the corn stalks grasped by these conveyor tines through a conveyor channel 31. At the end of the conveyor channel, the corn stalks are received by snapping devices 2 extending transversely to the direction of travel of the combine harvester. The function of these snapping devices 2 will be discussed in great detail in association with FIGS. 3 and 4.

FIG. 2 also shows the arrangement of the chopping device 4. That is, the front attachment 1 is coupled to a feed rake 32 of a combine harvester. The feed rake 32 comprises a feed rake shaft 33, which is driven via a main belt drive 33a and drives conveyor chains in the interior of a feed rake housing 34. The feed rake shaft 33 protrudes from the feed rake housing 34 on both sides and forms the driven mechanisms 5 and 21. The first universal drive shaft 6, which extends to the primary disc 10 of the variator transmission 11, is fastened at the driven mechanism 5 via the form-locking clutch 7. Proceeding from this primary disc 10, the drive torque is transferred via the drive belt 13 to the secondary disc 12. The secondary disc is connected via the output shaft 14 to a drive pinion 37 of the chain drive 17. The drive chain extends to the cross conveyor 3. A chain 38 of this chain drive 17 drives a shaft 40 of the cross conveyor 3 via a driven pinion 39. The belt drive 16 extends parallel to this chain drive 17. The belt drive comprises a drive pulley 41, which is connected in a rotationally fixed manner to the output shaft 14, a drive belt 42, and a driven pulley 43, which is connected to a drive shaft 44 of the snapping device 2.

A second end of the feed rake shaft 33 also protrudes beyond the feed rake housing 34 and is connected to a drive of the chopping device 4 (as described in conjunction with FIG. 1). To this end, the corresponding second driven mechanism 21 is connected via the second universal drive shaft 22 to a drive pulley 47. Drive pulley 47 drives the transmission 24 via a drive belt 48 and a driven pulley 49. As explained above, the transmission 24 is connected to the main drive shaft 25 of the chopping device 4, which extends transversely to the direction of travel of the combine harvester.

Figure 3:
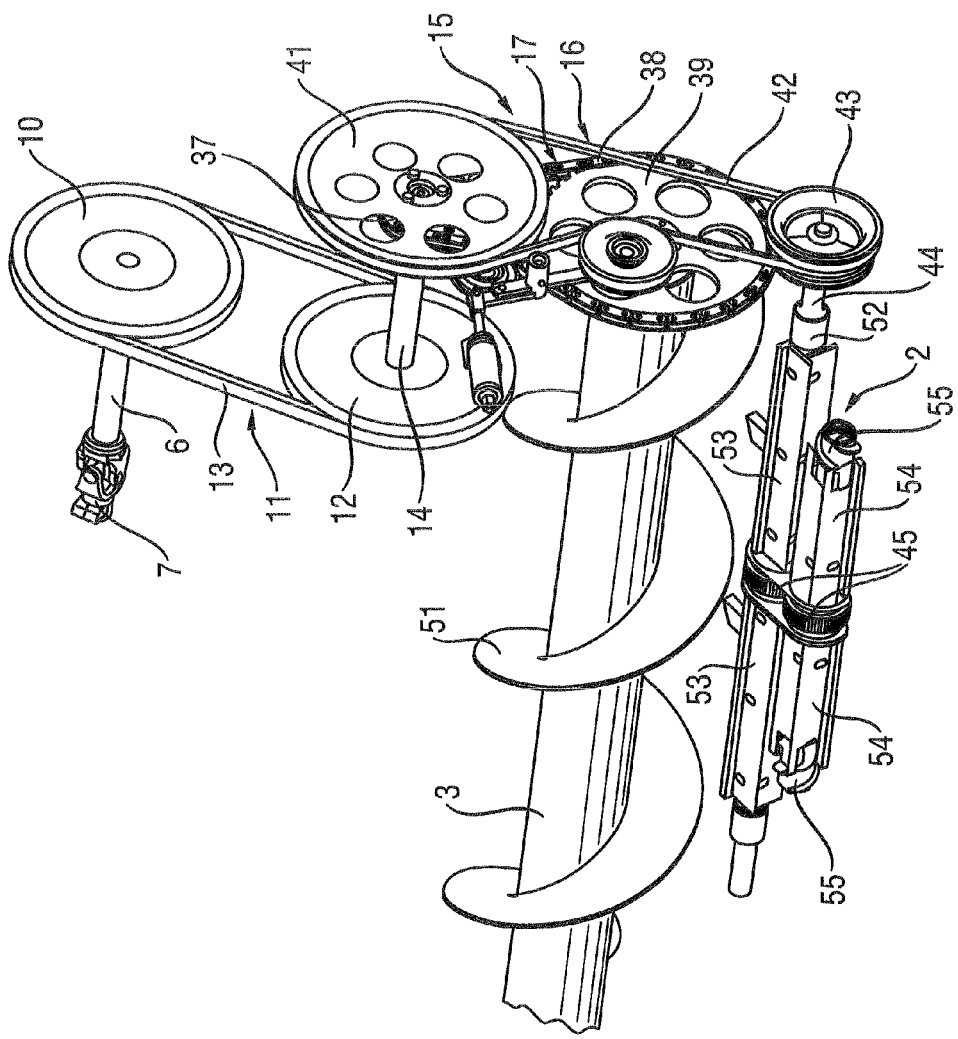
FIG. 3 shows a separate representation of the drive of a cross conveyor and a snapping device in a perspective representation according to FIG. 2.

As shown in FIG. 3, the cross conveyor 3 comprises two opposing auger sections, of which only the auger section 51 assigned to the left half of the front attachment 1 (as viewed in the direction of travel), is shown in the representation. FIG. 3 also shows that the snapping device 2 comprising a snapping shaft 52 and a first snapping roller 53 disposed thereon. These first snapping rollers 53 are connected in a driving manner via a gear pair 45 to second snapping rollers 54. The second snapping rollers 54 are equipped at the ends thereof with auger sections 55 for drawing in the corn stalks.

Figure 4:
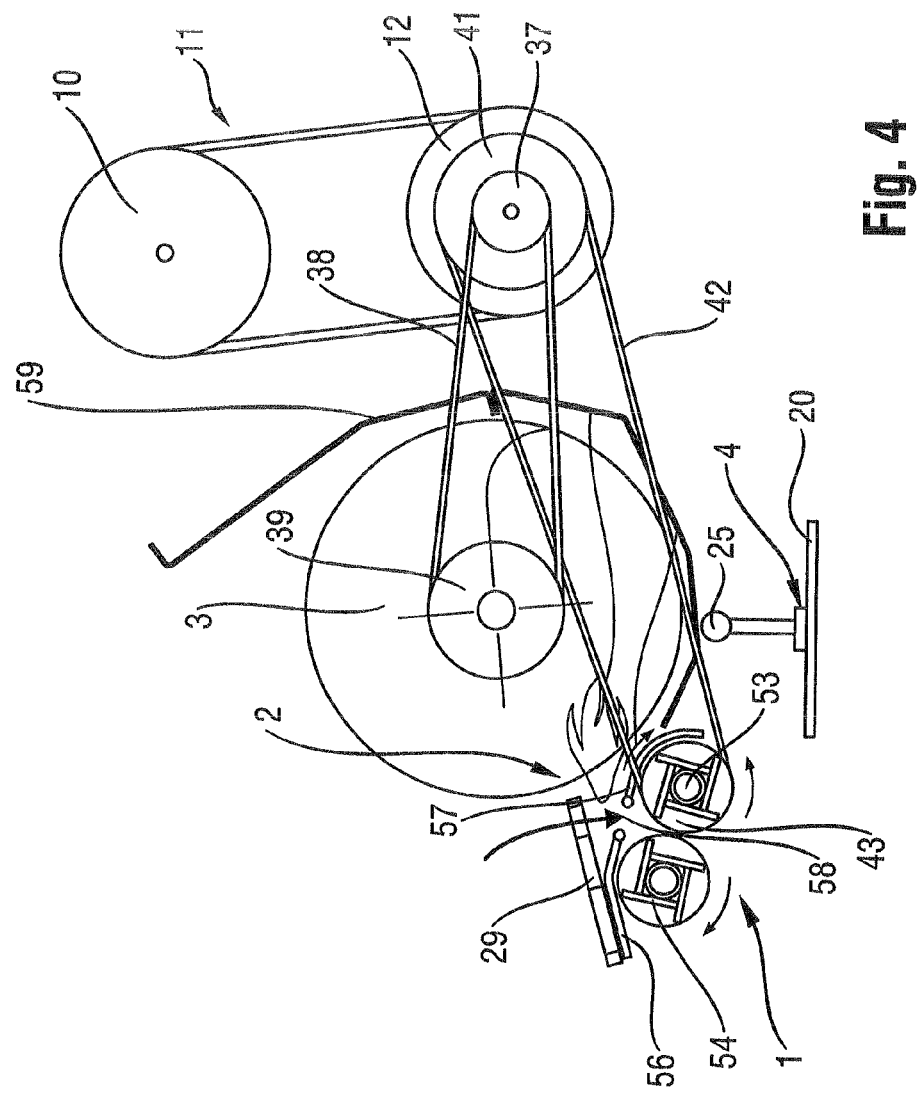
FIG. 4 shows a side view of the drive of the snapping device and the cross conveyor for a front attachment according to FIG. 2.

FIG. 4 shows the corresponding arrangement and the drive of the harvesting devices, i.e. the snapping device 2, the cross conveyor 3, and the chopping device 4. In FIG. 4, the front attachment 1 comprises, in the region of the snapping device 2, a front snapping plate 56, a section of which is shown, and a rear snapping plate 57. The plates are separated from each other such that they form a snapping gap 58 above the snapping rollers 53 and 54. The arrow pointing into this snapping gap 58 indicates the direction in which the corn stalks are drawn by the snapping rollers 53 and 54 through these snapping rollers. FIG. 4 also shows that the variator transmission 11 according to the invention is disposed behind a rear panel 59 of the front attachment 1.

LIST OF REFERENCE SYMBOLS 1 front attachment
2 snapping device
3 cross conveyor
4 chopping device
5 first driven mechanism
6 first universal drive shaft
7 form-locking clutch
8 belt drive
9 hydraulic pump
10 primary disc
11 variator transmission
12 secondary disc
13 drive belt
14 output shaft
15 traction mechanism drive
16 belt drive
17 chain drive
18 overload clutch of 3
19 overload clutch of 2
20 knife of 4
21 second driven mechanism
22 second universal drive shaft
23 belt drive
24 transmission
25 main drive shafts of 4
26 overload clutches of 4
27 crop divider
28 intake conveyor mechanisms
29 conveyor discs
30 conveyor tines
31 conveyor channel
32 feed rake
33 feed rake shaft
33a main belt drive
34 feed rake housing
37 drive pinion of 7
38 chain
39 driven pinion of 7
40 shaft of 3

41 drive pulley of 16
42 drive belt of 16
43 driven pulley of 16
44 drive shaft of 2
45 gear pair
47 drive pulley
48 drive belt
49 driven pulley
51 auger section
52 snapping shaft of 2
53 first snapping rollers
54 second snapping rollers
55 auger sections of 54
56 front snapping plate
57 rear snapping plate
58 snapping gap
59 rear panel As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A front attachment (1) for harvesting corn, for a self-propelled combine harvester, comprising
    harvesting devices (2, 3, 28) for grasping and guiding corn stalks, for picking corn cobs and for conveying the picked corn cobs;
    intake conveyor mechanisms (28) extending across the width of the front attachment;
    snapping devices (2) disposed downstream of the intake conveyor mechanisms (28) in the direction of the crop flow and configured with snapping rollers (53, 54) rotating opposite to the direction of travel; and
    a cross conveyor (3) equipped with opposing auger sections (51) draws harvested corn cobs together in the center of the front attachment (1) and feeds the harvested corn cobs to a feed rake (32);
    wherein one or more of the intake conveyor mechanisms (28), the snapping rollers (53, 54) and the cross conveyor (3) are driven via at least one driven mechanism (5) of the combine harvester; and
    wherein the at least one driven mechanism (5) is connected to a steplessly variable transmission disposed at the front attachment (1) and comprising an output shaft (14) that is directly or indirectly connected to at least one or more of a drive shaft of the intake conveyor mechanisms (28), a drive shaft (44) of the snapping rollers (53, 54), a drive shaft (40) of the cross conveyor (3) and a main drive shaft of a chopping device (4) for chopping the corn stalks.

2. A front attachment (1) for harvesting corn for a self-propelled combine harvester, comprising
    harvesting devices (2, 3, 28) for grasping and guiding corn stalks, for picking corn cobs and for conveying the picked corn cobs;
    intake conveyor mechanisms (28) extending across the width of the front attachment;
    snapping devices (2) disposed downstream of the intake conveyor mechanisms (28) in the direction of the crop flow and comprising snapping rollers (53, 54) rotating opposite to the direction of travel; and
    a cross conveyor (3) is equipped with opposing auger sections (51) for drawing harvested corn cobs together in the center of the front attachment (1) and feeds the corn cobs to a feed rake (32);
    wherein one or more of the intake conveyor mechanisms (28), the snapping rollers (53, 54) and the cross conveyor (3) are driven via at least one driven mechanism (5) of the combine harvester; and
    wherein the driven mechanism (5, 21) is connected to a multi-stage transmission that is disposed at the front attachment (1) and comprises an output shaft that is directly or indirectly connected exclusively to a drive of the snapping rollers (53, 54) and the cross conveyor (3).

3. The front attachment (1) according to claim 1, wherein the at least one steplessly variable transmission is coupled via a universal drive shaft (6) to the at least one driven mechanism (5) and drives at least one of the harvesting devices (2, 3, 28) via at least one downstream traction mechanism drive (15).

4. The front attachment (1) according to claim 1, wherein the at least one steplessly variable transmission is designed as a variator transmission (11), wherein the variator transmission has a primary disc (10) and a secondary disc (12) that are directly or indirectly supported at the front harvesting attachment (1), wherein the primary disc (10) is non-rotatably connected to a universal drive shaft (6) coupled to the driven mechanism (5) and wherein the secondary disc (12) is non-rotatably connected to one or more of a drive mechanism of the intake conveyor mechanisms (28), one of the snapping rollers (53, 54), the cross conveyor (3) and the main drive shaft of the chopping device (4).

5. The front attachment (1) according to claim 1, wherein one end of a feed rake shaft (33) is designed as a driven mechanism (5), to which the universal drive shaft (6) is coupled and wherein a further universal drive shaft (22) is coupled to a second end of the feed rake shaft (33) and is connected via a further traction mechanism drive (23) in a driving manner to the main drive shaft (25) or the knife shafts of the chopping device (4).

6. The front attachment (1) according to claim 1, wherein a universal drive shaft (6, 22) driving the steplessly variable transmission or the transmission is connected to a drive of a hydraulic pump (9).

7. The front attachment (1) according to claim 1, wherein at least one overload clutch (40) is disposed between the drive mechanism (5) and a shaft (40) of the cross conveyor (3), a drive mechanism (44) of the snapping rollers (53, 64) or both.

8. The front attachment (1) according to claim 1, wherein the steplessly variable transmission is disposed behind a rear panel (59) of the front attachment (1).

9. The front attachment (1) according to claim 4, wherein the output shaft (14) extending from the secondary disc (12) drives the cross conveyor (3) via a chain drive (17), and drives the snapping rollers (53, 54) via a belt drive (16).

* * * * *